(12) United States Patent
Stienstra et al.

(10) Patent No.: US 6,444,732 B1
(45) Date of Patent: Sep. 3, 2002

(54) INCREASING THE SELF-POLISHING PROPERTIES OF ANTIFOULING PAINTS

(75) Inventors: Pieter Sijbren Stienstra, Lelystad; Marcel Vos, Huizen, both of (NL)

(73) Assignee: Fina Research, S.A., Feluy (BE)

( * ) Notice: Subject to any disclaimer, the term of this patent is extended or adjusted under 35 U.S.C. 154(b) by 0 days.

(21) Appl. No.: 09/691,863

(22) Filed: Oct. 19, 2000

Related U.S. Application Data

(63) Continuation of application No. 08/905,982, filed on Aug. 5, 1997, now abandoned.

(30) Foreign Application Priority Data

Aug. 7, 1996 (BE) .......................................... 96112722

(51) Int. Cl.⁷ ............................ C08K 5/46; C08K 3/10; C08K 3/18
(52) U.S. Cl. ......................... 524/83; 524/413; 524/432; 523/122; 523/177
(58) Field of Search .......................... 524/83, 413, 432; 523/122, 177

(56) References Cited

U.S. PATENT DOCUMENTS 5,712,275 A * 1/1998 Van Gestel .............. 514/222.5
5,777,110 A * 7/1998 Davis et al. .................... 544/2

* cited by examiner

*Primary Examiner*—Kriellion A. Sanders
(74) *Attorney, Agent, or Firm*—William D. Jackson

(57) ABSTRACT

Substituted 1,4,2-oxathiazines and their mono- and di-oxides, disclosed in WO-A-9505739, are used as additive to increase the self-polishing properties of antifouling paints.

The additive is used in an amount of 0.5 to 9.9 wt. %, based on the total weight of the dry mass of the composition, preferably 1 to 8 wt. %, most preferably 2 to 4 wt. %. The preferred additive is 3-(3,4-dichlorophenyl)-5,6-dihydro-1,4,2-oxathiazine dioxide.

22 Claims, No Drawings

INCREASING THE SELF-POLISHING PROPERTIES OF ANTIFOULING PAINTS

This Application is a continuation of prior application Ser. No. 08/905,982, filed Aug. 5, 1997 now abandoned.

The present invention relates to the increase of self-polishing properties of marine antifouling paints. More particularly, it relates to the use of specific additives that increase the erosion rate of self-polishing antifouling paints.

Antifouling paints for ship hulls comprise an important sub-class of paints prepared with binders which are copolymers that upon hydrolysis release a biocide, the copolymers remaining after loss of the biocide being sufficiently water-soluble to be washed off the surface. The slow dissolution of the copolymer helps keeping the surface of the coating smooth, hence the name "self-polishing" given to those paints. Indeed, it has long ago been shown that speed and fuel consumption are strongly influenced by the roughness of the coating.

Self-polishing coating formulations are generally based on polymeric binders incorporating a trialkyltin carboxylate group bound to the backbone of the polymer through the use of trialkyltin (meth)acrylate comonomers. Hydrolysis on the surface releases a trialkyltin toxicant contributing to the antifouling properties, and leaves a more hydrophilic backbone which can dissolve in the sea-water, contributing to the self-polishing properties.

The first self-polishing antifouling paints were based on copolymers containing high amounts of trialkyltin (meth)acrylate copolymers. GB-A-1457590 disclosed one of the first commercial compositions and claimed a paint wherein the film-forming copolymer contained from 50 to 80 wt. % of units of triorganotin salt of olefinically unsaturated carboxylic acid; the composition claimed also contained a hydrophobic organic retarder for retarding the rate of ion exchange between sea-water and the copolymer.

More recently, environmental concerns have led to a reduction in the amount of tin-containing comonomer in marine paints. Indeed, concentrations of toxicants can build up sufficiently to affect life in harbours or even in bays; further, the potential of tin entrance in the food chain might affect humans.

The reduction in the amount of tin-containing comonomer has however led to a reduction of the solubility of the remaining backbone, detrimentally affecting the self-polishing properties. The situation has thus been completely reversed since the early days of self-polishing antifouling paints, and there is now a need in the art for ways of increasing self-polishing properties.

The applicants have now surprisingly found that certain oxathiazines can be used as additive in self-polishing antifouling paints to increase the self-polishing properties thereof.

Those oxathiazines are described in WO-A-9505739, the disclosure of which is incorporated herein. They are substituted 1,4,2-oxathiazines and their mono- or di-oxides, wherein:

the substituent in position 3 represents (a) phenyl; phenyl substituted with 1 to 3 substituents independently selected from hydroxyl, halo, C1–12 alkyl, C5–6 cycloalkyl, trihalomethyl, phenyl, C1–5 alkoxy, C1–5 alkylthio, tetrahydropyranyloxy, phenoxy, C1–4 alkylcarbonyl, phenylcarbonyl, C1–4 alkylsulfinyl, carboxy or its alkali metal salt, C1–4 alkyloxycarbonyl, C1–4 alkylaminocarbonyl, phenylaminocarbonyl, tolylaminocarbonyl, morpholinocarbonyl, amino, nitro, cyano, dioxolanyl or C1–4 alkyloxyiminomethyl; naphthyl; pyridinyl; thienyl; furanyl; or thienyl or furanyl substituted with one to three substituents independently selected from C1–4 alkyl, C1–4 alkyloxy, C1–4 alkylthio, halo, cyano, formyl, acetyl, benzoyl, nitro, C1–4 alkyloxycarbonyl, phenyl, phenylaminocarbonyl and C1–4 alkyloxyiminomethyl; or (b) a substituent of generic formula

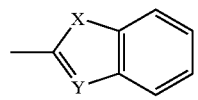

wherein X is oxygen or sulphur; Y is nitrogen, CH or C(C1–4 alkoxy); and the C6 ring may have one C1–4 alkyl substituent;

a substituent selected from C1–4 alkyl or benzyl may be present in position 5 or 6.

WO-A-9505739 discloses that antifouling paint compositions can contain from 10 up to 75 wt. % of the active ingredient, based on the total weight of the dry mass of said composition.

The additive should be used in an amount of 0.5 to 9.9 wt. %, based on the total weight of the dry mass of the composition, preferably 1 to 8 wt. %, most preferably 2 to 4 wt. %.

By using the oxathiazines according to WO-A-9505739 as additives in an amount of 0.5 to 9.9 wt. %, based on the total weight of the dry mass of the composition, in self-polishing antifouling paints, the Applicant has unexpectedly found that the paints not only have regular antifouling performance throughout time but also expose with an improved efficiency a smooth layer at the paint surface.

It is surprising that the oxathiazines disclosed in WO-A-9505739 could have a favourable influence on the self-polishing properties because they have a very low water solubility which up to now was believed to have a detrimental influence on those properties.

It is further surprising that those oxathiazines would have an effect in self-polishing antifouling paints when WO-A-9505739 teaches that antifouling paints should contain said oxathiazines in a much higher amount, namely in an amount of 10 to 75 wt. %, based on the total weight of the dry mass of the composition.

The self-polishing paint composition according to the invention comprises the usual components and at least one compound according to WO-A-9505739 in an amount of 0.5 to 9.9 wt. %.

According to a first embodiment, the self-polishing paint composition comprises:
(i) a trialkyltin (meth)acrylate copolymer;
(ii) at least one compound according to WO-A-9505739, in an amount of 0.5 to 9.9 wt. %, based on the total weight of the dry mass of the composition.

Trialkyltin (meth)acrylate copolymers are well-known in the art of self-polishing paints since GB-A-1457590 and need thus not be described here.

According to a second embodiment, the self-polishing paint composition comprises:
(i) a first component selected from one or more rosin-based components;
(ii) a (co)polymer as binder;
(iii) at least one sparingly soluble metalliferous pigment;
(iv) at least one compound according to WO-A-9505739, in an amount of 0.5 to 9.9 wt. %, based on the total weight of the dry mass of the composition.

According to a third embodiment, the self-polishing paint composition comprises:

(i) a first component selected from one or more rosin-based components;
(ii) a hydrophilic binder;
(iii) at least one sparingly soluble metalliferous pigment;
(iv) at least one compound according to WO-A-9505739, in an amount of 0.5 to 9.9 wt. %, based on the total weight of the dry mass of the composition.

Hydrophilic binders suitable for use in such compositions are well-known in the art; they are exemplified by the copolymers disclosed in EP-A-289481 and EP-A-526441.

According to a fourth embodiment, the self-polishing paint composition comprises:

(i) a (co)polymer based on copper acrylate;
(ii) optionally, one or more rosin-based components;
(iii) at least one sparingly soluble metalliferous pigment;
(iv) at least one compound according to WO-A-9505739, in an amount of 0.5 to 9.9 wt. %, based on the total weight of the dry mass of the composition.

Copper acrylate based (co)polymers are well known in the art they are exemplified by those disclosed in U.S. Pat. No. 5,236,493.

Rosin is a loosely used term, denoting the result of a harvesting of the gum exudations from surface cuts made in certain species of trees. Rosin is usually defined as the product obtained from pines; similar products include congo, damar, kauri and manila gums. Other processes for obtaining rosin include dissolving wood rosin from pine stumps after forests have been felled, or refining a by-product of the Kraft paper manufacturing process to produce tall oil rosin.

Pine-originating rosin is preferably chosen, although similar products may be contemplated providing they have a similar hydrophilic/lipophilic balance.

The main component (about 80 wt. %) of rosin is abietic acid, also called sylvic acid (Chemical Abstracts Service Registry Number: 514-10-3), which could be used instead of rosin.

The preferred rosin-based components are rosin itself, its copper or zinc derivatives, hereinafter called copper resinate and zinc resinate, other resinate salts having a comparable solubility, or mixtures thereof. The salts are prepared by any known methods, typically by metathesis with the metal carbonate, oxide, hydroxide or hydroxycarbonate (whether in situ or in a separate reaction). In some case, the transformation of abietic acid into salts thereof may upgrade properties like the melting point, hardness, durability, water or solvent resistance.

The paint compositions according to the invention also comprise at least one sparingly soluble metalliferous pigment; they may additionally comprise one or more pigments which are highly insoluble in sea-water and/or other biocides.

The metalliferous pigment sparingly soluble in sea-water is exemplified by cuprous thiocyanate, cuprous oxide, zinc oxide, cupric acetate meta-arsenate, or zinc chromate. The paint preferably includes at least one metalliferous pigment selected from zinc oxide, cuprous oxide, cuprous thiocyanate and pigments. These pigments have a sea-water solubility such that the pigment particles do not survive at the paint surface. The pigment has the effect of inducing the overall smoothing which the relatively-moving sea-water exerts on the paint film, minimising localised erosion and preferentially removing excrescences formed during the application of the paint. Mixtures of sparingly soluble pigments can be used, the most preferred being a mixture of zinc oxide, which is most effective at inducing the gradual dissolution of the paint, with cuprous oxide and/or cuprous thiocyanate, which are more effective marine biocides, said mixture preferably comprising at least 25 wt. % of cuprous oxide and/or thiocyanate, the balance being zinc oxide.

The paint composition can additionally contain a pigment which is highly insoluble in sea-water, such as titanium dioxide or ferric oxide. Such highly insoluble pigments can be used at up to 40 percent by weight of the total pigment component of the paint. Although the highly insoluble pigment has the effect of retarding the dissolution of the paint, it is highly desired because it is very economical; it is an added advantage of this invention to allow for the inclusion of additional amounts of such highly insoluble pigment whilst retaining good self-polishing properties.

The proportion of pigment to polymer is generally such as to give a pigment volume concentration of at least 25 percent, preferably at least 35 percent, in the dry paint film. The upper limit of pigment concentration is the critical pigment volume concentration. Paints having pigment volume concentrations of about 50 percent, for example, have been found very effective for smoothing in sea-water and preventing fouling.

EXAMPLES

In all examples, there was used as binder a copolymer of vinyl chloride and vinyl isobutyl ether commercially available as Laroflex MP 45 (Laroflex is a trade name of BASF).

As additive improving the self-polishing properties, there was used:

in the examples according to the invention: an oxathiazine according to WO-A-9505739 wherein n=2, R1=H and R=3,4-dichlorophenyl, [i.e. 3-(3,4-dichlorophenyl)-5,6-dihydro-1,4,2-oxathiazine dioxide], and in the comparative examples: diuron.

The self-polishing paints were tested for their self-polishing properties according to the following procedure. Steel discs of 20 cm diameter were first coated with a 220 um dry film thickness layer of a commercially available anti-corrosive paint based on coal tar and epoxy resin. The antifouling paint were then applied as two layers having a total dry film thickness of about 250 um. The discs were rotated in a tank filled with continuously renewed sea-water at a temperature of 20 degrees Celsius; the circumferential speed of the discs was about 17 knots (31 km/h). Thickness measurements were made after 7 weeks storage, on 15 different places at 9 cm from each disc centre, over a period of 177 days. The average erosion rates are given below.

Compositions (parts by volume excluding solvents)

|  | Example | | | | A | B |
|---|---|---|---|---|---|---|
|  | 1 | 2 | 3 | 4 | (comparative) | |
| rosin | 31.4 | 31.7 | 32.4 | 35.5 | 31.7 | 32.4 |
| binder | 15.4 | 15.7 | 16.1 | 17.6 | 15.7 | 16.1 |
| epoxidised oil | 5.0 | 5.1 | 5.2 | 5.7 | 5.1 | 5.2 |
| cuprous oxide | 24 | 26 | 27 | 16 | 6 | 27 |
| zinc oxide | 3.0 | 5.5 | 6.0 | 9.0 | 5.5 | 6.0 |
| talc | 3.0 | 3.0 | 3.0 | 3.0 | 3.0 | 3.0 |
| TiO2 | 3.0 | 3.0 | 3.0 | 3.0 | 3.0 | 3.0 |
| bentonite | 3.0 | 3.0 | 3.0 | 3.0 | 3.0 | 3.0 |

-continued

Compositions (parts by volume excluding solvents)

|  | Example | | | | A (comparative) | B |
| --- | --- | --- | --- | --- | --- | --- |
|  | 1 | 2 | 3 | 4 | | |
| additive (see text) | 11.0 | 5.5 | 2.8 | 5.5 | 5.5 | 2.8 |
| erosion rate (um/month) | 11 | 10 | 10 | 9 | 5 | 5 |

The calculated composition by weight is given hereafter:

|  | Example | | | | A (comparative) | B |
| --- | --- | --- | --- | --- | --- | --- |
|  | 1 | 2 | 3 | 4 | | |
| rosin | 7.5 | 7.1 | 7.1 | 9.0 | 7.1 | 7.1 |
| binder | 13.3 | 12.5 | 12.5 | 15.8 | 12.5 | 12.5 |
| epoxidised oil | 1.9 | 1.8 | 1.9 | 2.4 | 1.8 | 1.9 |
| cuprous oxide | 56.0 | 55.9 | 56.4 | 39.1 | 55.9 | 56.4 |
| zinc oxide | 6.6 | 11.3 | 12.0 | 20.9 | 11.3 | 12.0 |
| talc | 3.2 | 3.0 | 2.9 | 3.4 | 3.0 | 2.9 |
| TiO2 | 4.8 | 4.4 | 4.3 | 4.9 | 4.4 | 4.3 |
| bentonite | 1.9 | 1.8 | 1.8 | 2.0 | 1.8 | 1.8 |
| additive (see text) | 4.8 | 2.2 | 1.1 | 2.5 | 2.2 | 1.1 |
| total dry mass | 100 | 100 | 100 | 100 | 100 | 100 |
| solvents | 28.7 | 26.7 | 25.9 | 32.5 | 26.7 | 25.9 |

The solvents consisted of 1.25 wt. % (calculated on the total dry mass) of ethanol and of a mixture of xylene and methyl isoamyl ketone in a 3:1 weight ratio.

What is claimed is:

1. A process for increasing the self-polishing properties of an anti-fouling paint composition comprising adding to said anti-fouling paint composition an effective amount of an erosion additive selected from substituted 1,4,2-oxathiazines and their mono- and di-oxides, the substituent in position 3 representing (a) phenyl; phenyl substituted with 1 to 3 substituents independently selected from hydroxyl, halo, $C_1$–$C_{12}$ alkyl, $C_5$–$C_6$ cycloalkyl, trihalomethyl, phenyl, $C_1$–$C_5$ alkoxy, $C_1$–$C_5$ alkylthio, tetrahydropyranyloxy, phenoxy, $C_1$–$C_4$ alkylcarbonyl, phenylcarbonyl, $C_1$–$C_4$ alkylsulfinyl, carboxy or its alkali metal salt, $C_1$–$C_4$ alkyloxycarbonyl, $C_1$–$C_4$ alkylaminocarbonyl, phenylaminocarbonyl, tolylaminocarbonyl, morpholinocarbonyl, amino, nitro, cyano, dioxolanyl or $C_1$–$C_4$ alkyloxyiminomethyl; naphthyl; pyridinyl; thienyl; furanyl; or thienyl or furanyl substituted with one to three substituents independently selected from $C_1$–$C_4$ alkyl; $C_1$–$C_4$ alkyoxy, $C_1$–$C_4$ alkylthio, halo, cyano, formyl, acetyl, benzoyl, nitro, $C_1$–$C_4$ alkyloxycarbonyl, phenyl, phenylaminocarbonyl and $C_1$–$C_4$ alkyloximinomethyl; or (b) a substituent of generic formula

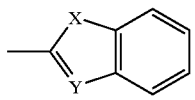

wherein X is oxygen or sulphur, Y is nitrogen, CH or C($C_1$–$C_4$ alkoxy); and the $C_6$ ring may have one $C_1$–$C_4$ alkyl substituent; a second substituent selected from $C_1$–$C_4$ alkyl or benzyl being optionally present in position 5 or 6; said additive being added in an amount of 1 to 4 wt. % based on the total weight of the dry mass of the composition.

2. The process of claim 1 wherein the erosion additive is used in an amount of 2 to 4 wt. % based on the total weight of the dry mass of the composition.

3. The process of claim 1 wherein the erosion additive is 3-(3,4-dichlorophenyl)-5,6-dihydro-1,4,2-oxathiazine dioxide.

4. The process of claim 1 wherein the self-polishing paint composition comprises a trialkyltin (meth)acrylate copolymer in addition to the erosion additive.

5. The process of claim 1 wherein the self-polishing paint composition comprises a first component selected from one or more rosin-based components, a copolymer as binder, and at least one sparingly soluble metalliferous pigment in addition to the erosion additive.

6. The process of claim 1 wherein the self-polishing paint composition comprises a first component selected from one or more rosin-based components, a hydrophilic binder, and at least one sparingly soluble metalliferdus pigment in addition to the erosion additive.

7. The process of claim 1 wherein the self-polishing paint composition comprises a copolymer based on copper acrylate, at least one rosin-based component and at least one sparingly soluble metalliferous pigment in addition to the erosion additive.

8. The process according to any one of claims 5, 6, and 7 wherein the self-polishing paint composition comprises cuprous oxide as representing at least 25 wt. % of the sparingly soluble metalliferous pigments.

9. In a self-polishing antifouling paint composition having a dry mass component and a solvent component, the improvement comprising an erosion additive incorporated in said paint composition in an amount within the range of 1–4 wt. % of the dry mass component of the paint composition, said erosion additive selected from substituted 1,4,2-oxathiazines and their mono- and di-oxides, the substituent in position 3 representing (a) phenyl; phenyl substituted with 1 to 3 substituents independently selected from hydroxyl, halo, $C_1$–$C_{12}$ alkyl, $C_5$–$C_6$ cycloalkyl, trihalomethyl, phenyl, $C_1$–$C_5$ alkoxy, $C_1$–$C_5$ alkylthio, tetrahydropyranyloxy, phenoxy, $C_1$–$C_4$ alkylcarbonyl, phenylcarbonyl, $C_1$–$C_4$ alkylsulfinyl, carboxy or its alkali metal salt, $C_1$–$C_4$ alkyloxycarbonyl, $C_1$–$C_4$ alkylaminocarbonyl, phenylaminocarbonyl, tolylaminocarbonyl, morpholinocarbonyl, amino, nitro, cyano, dioxolanyl or $C_1$–$C_4$ alkyloxyiminomethyl; naphthyl; pyridinyl; thienyl; furanyl; or thienyl or furanyl substituted with one to three substituents independently selected from $C_1$–$C_4$ alkyl; $C_1$–$C_4$ alkyoxy, $C_1$–$C_4$ alkylthio, halo, cyano, formyl, acetyl, benzoyl, nitro, $C_1$–$C_4$ alkyloxycarbonyl, phenyl, phenylaminocarbonyl and $C_1$–$C_4$ alkyloximinomethyl; or (b) a substituent of generic formula

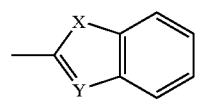

wherein X is oxygen or sulphur, Y is nitrogen, CH or C($C_1$–$C_4$ alkoxy); and the $C_6$ ring may have one $C_1$–$C_4$ alkyl substituent; a second substituent selected from $C_1$–$C_4$ alkyl or benzyl being optionally present in position 5 or 6.

10. The composition of claim 9 further comprising a pigment additive selected from the group consisting of zinc oxide, cuprous oxide, cuprous thiocyanate, and mixtures thereof.

11. The composition of claim 10 wherein said pigment additive comprises cuprous oxide.

12. The composition of claim 10 wherein said pigment additive comprises zinc oxide.

13. The composition of claim 10 wherein said pigment additive comprises a mixture of a zinc compound with another additive selected from the group consisting of cuprous oxide and cuprous thiocyanate and mixtures thereof.

14. The composition of claim 13 wherein said zinc compound is zinc oxide.

15. The composition of claim 13 wherein said composition comprises at least 25 wt. % of cuprous oxide or cuprous thiocyanate or mixtures of cuprous oxide and cuprous thiocyanate of the dry mass component of said paint composition.

16. The composition of claim 17 wherein the erosion additive is 3-(3,4-dichlorophenyl)-5,6-dihydro-1,4,2-oxathiazine dioxide.

17. In a self-polishing antifouling paint composition having a dry mass component and a solvent component, the improvement comprising an erosion additive incorporated in said paint composition in an amount within the range of 2–4 wt. % of the dry mass component of the paint composition, said erosion additive selected from substituted 1,4,2-oxathiazines and their mono- and di-oxides, the substituent in position 3 representing (a) phenyl; phenyl substituted with 1 to 3 substituents independently selected from hydroxyl, halo, $C_1$–$C_{12}$ alkyl, $C_5$–$C_6$ cycloalkyl, trihalomethyl, phenyl, $C_1$–$C_5$ alkoxy, $C_1$–$C_5$ alkylthio, tetrahydropyranyloxy, phenoxy, $C_1$–$C_4$ alkylcarbonyl, phenylcarbonyl, $C_1$–$C_4$ alkylsulfinyl, carboxy or its alkali metal salt, $C_1$–$C_4$ alkyloxycarbonyl, $C_1$–$C_4$ alkylaminocarbonyl, phenylaminocarbonyl, tolylaminocarbonyl, morpholinocarbonyl, amino, nitro, cyano, dioxolanyl or $C_1$–$C_4$ alkyloxyiminomethyl; naphthyl; pyridinyl; thienyl; furanyl; or thienyl or furanyl substituted with one to three substituents independently selected from $C_1$–$C_4$ alkyl; $C_1$–$C_4$ alkyoxy, $C_1$–$C_4$ alkylthio, halo, cyano, formyl, acetyl, benzoyl, nitro, $C_1$–$C_4$ alkyloxycarbonyl, phenyl, phenylaminocarbonyl and $C_1$–$C_4$ alkyloximinomethyl; or (b) a substituent of generic formula

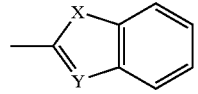

wherein X is oxygen or sulphur, Y is nitrogen, CH or C($C_1$–$C_4$ alkoxy); and the $C_6$ ring may have one $C_1$–$C_4$ alkyl substituent; a second substituent selected from $C_1$–$C_4$ alkyl or benzyl being optionally present in position 5 or 6.

18. The composition of claim 17 further comprising a pigment additive selected from the group consisting of zinc oxide, cuprous oxide, cuprous thiocyanate, and mixtures thereof.

19. The composition of claim 18 wherein said pigment additive comprises cuprous oxide.

20. The composition of claim 18 wherein said pigment additive comprises zinc oxide.

21. The composition of claim 18 wherein said pigment additive comprises a mixture of a zinc compound with another additive selected from the group consisting of cuprous oxide and cuprous thiocyanate and mixtures thereof.

22. The composition of claim 21 wherein said composition comprises at least 25 wt. % of cuprous oxide or cuprous thiocyanate or mixtures of cuprous oxide and cuprous thiocyanate of the dry mass component of said paint composition.

* * * * *